United States Patent Office 3,368,272
Patented Feb. 13, 1968

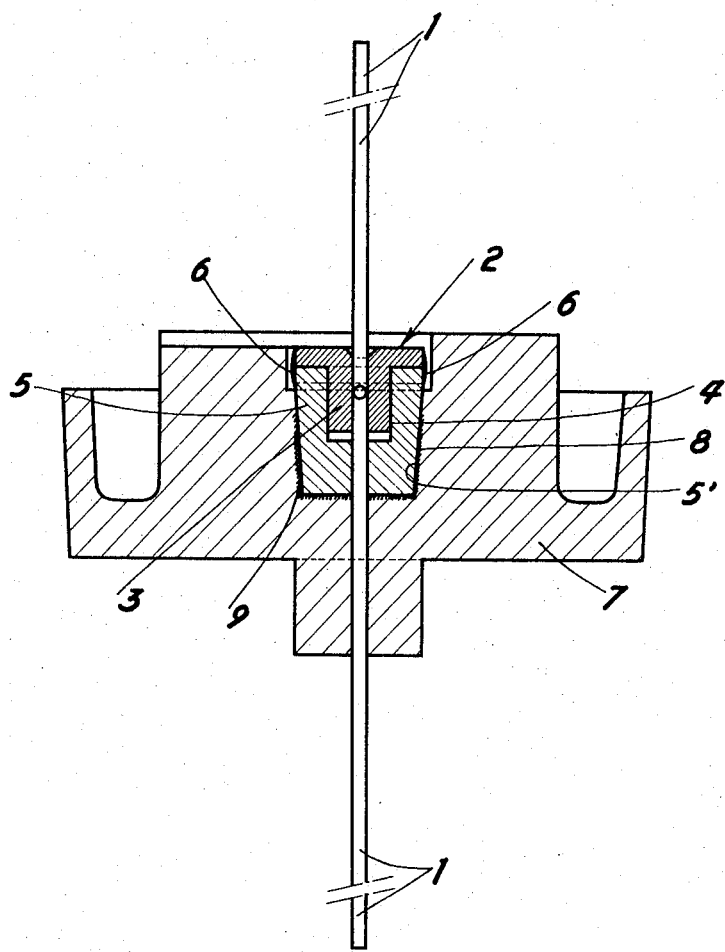

3,368,272
METHOD OF BONDING STAINLESS STEEL BY USING AN INTERMEDIATE MATERIAL
Carmen Wacongne, Seyssinet, and Bernard Vere, Sassenage, France, assignors to Societe anonyme: Societe Industrielle de Combustible Nucleaire, Annecy, Haute-Savoie, France, a corporation of France
Filed Nov. 16, 1965, Ser. No. 508,044
Claims priority, application France, Nov. 17, 1964, 995,273
5 Claims. (Cl. 29—494)

ABSTRACT OF THE DISCLOSURE

A stainless steel member is attached to a member of a high aluminum content by welding the steel member and the aluminum member to an intermediate member of high nickel content. The stainless steel member is welded to the nickel in a high vacuum by electronic bombardment. The aluminum member is welded to the nickel member by heating to 640° C. in a vacuum of $3 \times 10^{-6}$ mm. Hg for about 2 minutes to form a nickel-aluminum eutectic system and then cooled over a period of the order of 3 hours.

---

The present invention relates to a method for providing a sealed bond between a stainless steel member and an aluminum alloy member. The invention is also directed to the assemblies thus obtained and to equipments and devices including such sealed assemblies.

It has already been proposed to firmly bond steel layers of various grades by applying onto the contact surfaces thereof an intermediate metal or metalloid layer which diffuses into both steel layers; these known methods, which make use a kind of adherence layer, enable to improve the anti-corrosive, thermo-mechanical and plain mechanical properties of composite pieces capable of replacing solid one-metal pieces, which would be more expensive since they are formed of a single, expensive metal.

In case however it is required to obtain a communication, in a perfectly sealed manner, between the inside of a hollow composite piece of the above mentioned type with the outside thereof, it is found that the desired result can never be achieved in an absolutely reliable manner on account of the inadequacy of the necessary weldings.

It is known, on the other hand, that a direct bond between a piece of stainless steel and a piece of aluminum may be effected only under well determined operating conditions, although, even under such conditions, a reliable sealing bond will not be provided on account of the presence of intermediate brittle compounds which are formed when a stainless steel piece comes into contact with molten aluminum.

It is also known that in many cases, and particularly for certain measurements by means of thermocouples, it is essential that the temperature measuring elements thereof should pass, in perfectly sealed conditions for a wide range of temperatures, through the walls of containers or inside which occur the phenomena or reactions which are to be studied or controlled. The sealing is the more necessary when these phenomena or reactions develop dangerous radiations.

We have endeavored to solve this problem in the particular case of sealed aluminum-stainless steel passages, which are of a special interest in the case of metal bonds which should be perfectly impervious to helium both in the cold and up to temperatures of at least 200° C. We have ascertained that such a result could be achieved by using an intermediate material forming a eutectic system with aluminum or its alloys and presenting a good weldability with stainless steel. We have noted, in addition, that optimum results may be obtained with Ni- or with alloys having a high Ni- content, which form with aluminum an eutectic system at 640° C. and weld perfectly with stainless steels, particularly through electronic bombardment welding.

The method of producing a sealed connexion between a piece of stainless steel and a piece of aluminum or aluminum alloy by inserting an intermediate layer, consists essentially, in accordance with the invention, in welding, under a high vacuum, and through electronic bombardment, the stainless-steel piece onto an intermediate piece of nickel or of high Ni-content alloy, said pieces being maintained in intimate contact, bringing into intimate contact the aluminum or aluminum alloy piece, and the nickel piece, heating the assembly under high vacuum up to the temperature of formation of a nickel-aluminum eutectic, maintaining the assembly at said temperature during 1 to 3 minutes to cause homogeneous diffusion of the nickel into the aluminum whereby a homogeneous diffused bond is obtained, and slowly cooling down to a temperature of 50° C.

The heating may for example be carried out by induction heating under a vacuum of the order of $3 \times 10^{-6}$ mm. of Hg. The assembly is preferably maintained at the temperature of the eutectic system during 2 minutes. The subsequent slow cooling period should be of the order of 3 hours.

In order to promote homogeneous diffusion of the nickel into the aluminum, it is desirable to cause the stainless steel-nickel welded unit to rotate very slowly. The metallographic analysis shows a compact and tight, well welded bond, between the aluminum and the stainless steel, provided the contact between nickel and aluminum has been as perfect as possible: this condition may be obtained by a very careful machining of the respective surfaces of the nickel and stainless steel pieces.

An example of alloys having a high nickel content are those containing 75 to 80% Ni, such as the well-known "Inconel" nickel alloys. Aluminum alloys which may be welded to stainless steel are more particularly of the types known as AG5, AU4G, A5 etc.

A particularly interesting embodiment of the invention consists in using a nickel intermediate member having a male part and a female part, said male part being welded in a female part of the aluminum member, whereas the stainless steel member is shaped with a male part which is welded in the female part of the nickel member.

The invention enables to obtain among others plugs for the passage of thermocouples in aluminum-sheathed fuel elements, such as used in nuclear reactors. To this end, the thermocouple is brazed on a stainless-steel support, and the connexion between said support and an intermediate nickel layer and subsequently the connexion between this assembly and the aluminum sheath are effected as hereinabove described.

The invention will be best understood from the following description and the appended drawing, the single figure of which illustrates such a passage plug for a thermocouple, by way of example only.

In the drawing, the passage plug according to the invention comprises a thermocouple 1 secured by brazing on supporting member 2 of stainless-steel having a T-shaped cross section with a leg 3.

Said leg 3 fits frictionally in a bore 4, of same crosssection, machined in an intermediate member 5 made of an alloy having a high nickel content. The support 2 and the intermediate member 5 are welded to one another as at 6. Member 5 has a frusto-conical shape on the outside at 5', with an apex angle of the order of 5°. An aluminum plug 7 forming the end of a sheath (not illustrated) containing a fuel element for a nuclear reactor is bored in the shape of a truncated cone 8 the diametral dimensions of which are identical to those of the outer surface of piece 5. The nickel material of member 5 forms with the aluminum material of plug 7 an eutectic system 9 homogeneously diffused along the adjacent concentric surfaces of portions 5' and 8 of member 5 and plug 7, respectively.

Such a passage unit may be manufactured according to the invention by making use of a device comprising a high frequency generator of 2 kw. output at a frequency of 3 mHz., a sealed enclosure consisting of a quartz tube having an inner diameter of 50 mm., a pumping set including a primary set of 27 cubic meters per hour, a secondary pump of 350 l./sec., a vacuum controlling apparatus and a temperature measuring apparatus. The thermocouple 1 is secured by brazing on the stainless-steel member 2, using a high temperature brazing mixture and heating at a temperature of 950° C. under vacuum. Leg 3 of support 2 is inserted into bore 4 of member 5 which is made of 80% Ni-content "Inconel" alloy and the welding is carried out at 6 by electronic bombardment, inside the vacuum enclosure. After having achieved this welding, the frusto-conical portion 5' of member 5 is accommodated in the correspondingly shaped bore 8 of plug 7 which is made of a 99.99% aluminum material, and perfectly centered therein, this assembly being inserted in the vacuum enclosure wherein a secondary vacuum has been achieved ($3.10^{-6}$ mm. Hg): said assembly is heated by induction to bring its temperature in one hour to 640° C., thus producing a nickel-aluminum eutectic; the homogeneous diffusion of nickel into aluminum is promoted after the formation of said eutectic by maintaining, during 2 minutes, the temperature at 640° C., while causing the assembly to slowly undergo a rotation movement. The assembly is then left to cool over a period of 3 hours to as low as 50° C. while being maintained under the same vacuum.

The same result was obtained under the same conditions with a piece 5 of substantially pure nickel material.

What we claim is:

1. A method for producing a sealed bond between a piece of stainless steel and a piece of a material having a high aluminum content, each having a contact surface of predetermined shape, comprising the steps of welding, under a high vacuum, through electronic bombardment, said contact surface of said stainless steel piece on a first contact surface of an intermediate piece of a material having a high nickel content, said intermediate piece having a first and a second contact surface, said first contact surface having the same shape as said contact surface of said stainless steel piece, said contact surface of said stainless steel piece and said first contact surface of said intermediate piece being maintained in intimate contact relationship, bringing into intimate contact said second contact surface of said intermediate piece and said contact surface of said aluminum piece, thus forming a free assembly comprising said welded stainless steel and intermediate pieces and said aluminum piece, heating said assembly at a temperature of at least about 640° C. at which a nickel-aluminum eutectic system is formed, maintaining said assembly at said temperature during a period of 1 to 3 minutes to obtain a homogeneous diffusion of nickel into aluminum, whereby a completely welded assembly is obtained and slowly cooling said completely welded assembly under vacuum down to about 50° C.

2. A method as claimed in claim 1, in which said heating is carried out by electrical induction and under a vacuum of the order of $3.10^{-6}$ mm. of Hg.

3. A method as claimed in claim 1, in which said free assembly is maintained at the eutectic system formation temperature during about 2 minutes.

4. A method as claimed in claim 1, in which said slow cooling is carried out over a period of about 3 hours.

5. A method as claimed in claim 1, in which said intermediate piece is made of a nickel alloy having a nickel content of about 75 to 80%.

No references cited.

HYLAND BIZOT, *Primary Examiner.*